(12) United States Patent
Barjon et al.

(10) Patent No.: US 10,730,255 B2
(45) Date of Patent: Aug. 4, 2020

(54) METHOD FOR PLACING A SELF-SEALING PRODUCT ON THE INNER SURFACE OF A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Stephane Barjon, Clermont-Ferrand (FR); Christian Beldent, Clermont-Ferrand (FR); Bruno Dussardier, Clermont-Ferrand (FR); Sarah Joandel, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 504 days.

(21) Appl. No.: 15/310,672

(22) PCT Filed: May 7, 2015

(86) PCT No.: PCT/EP2015/060118
§ 371 (c)(1),
(2) Date: Nov. 11, 2016

(87) PCT Pub. No.: WO2015/173120
PCT Pub. Date: Nov. 19, 2015

(65) Prior Publication Data
US 2017/0080655 A1    Mar. 23, 2017

(30) Foreign Application Priority Data
May 13, 2014  (FR) ..................... 14 54248

(51) Int. Cl.
B29C 73/18        (2006.01)
B29C 48/92        (2019.01)
(Continued)

(52) U.S. Cl.
CPC ............ B29C 73/18 (2013.01); B29C 48/155 (2019.02); B29C 48/625 (2019.02); B29C 48/92 (2019.02);
(Continued)

(58) Field of Classification Search
CPC ... B29C 73/18; B29C 47/026; B29C 47/6087; B29C 47/92; B29C 73/166;
(Continued)

(56) References Cited

U.S. PATENT DOCUMENTS 3,981,342 A * 9/1976 Farber .................. B29C 73/025
                                            152/504
4,115,172 A * 9/1978 Baboff ................. B29C 73/166
                                            118/202
(Continued)

FOREIGN PATENT DOCUMENTS

EP        0229708 A2    7/1987

OTHER PUBLICATIONS

John S. Dick, Basic Rubber Testing—Selecting Methods for a Rubber Test Program: (MNL 39), 2003, Publisher: ASTM International, p. 43 (Year: 2003).*
(Continued)

*Primary Examiner* — Joseph S Del Sole
*Assistant Examiner* — Asha A Thomas
(74) *Attorney, Agent, or Firm* — Dickinson Wright PLLC; Steven Hurles

(57) ABSTRACT

The process includes a non-crosslinked self-sealing composition which is introduced into an extrusion means, the geometric and thermodynamic characteristics of which have
(Continued)

been specially adapted. The speed and temperature conditions of the extrusion means are adjusted so that, at an application nozzle forming the outlet die of the extrusion means, the self-sealing composition is crosslinked. The application nozzle is brought close to the internal surface of the casing previously set in relative motion with respect to the application nozzle, and an extruded and crosslinked bead that has a given width and profile is deposited directly on the internal surface of the casing.

16 Claims, 2 Drawing Sheets

(51) Int. Cl.
    *B29C 48/625*      (2019.01)
    *B29C 73/16*      (2006.01)
    *B29C 48/155*      (2019.01)
    *B29D 30/06*      (2006.01)
    B29C 48/25      (2019.01)
    B29K 9/00      (2006.01)
    B29L 30/00      (2006.01)

(52) U.S. Cl.
    CPC ........ *B29C 73/166* (2013.01); *B29D 30/0685* (2013.01); B29C 48/2526 (2019.02); B29C 2948/9258 (2019.02); B29C 2948/92695 (2019.02); B29C 2948/92704 (2019.02); B29C 2948/92857 (2019.02); B29D 2030/0686 (2013.01); B29D 2030/0694 (2013.01); B29D 2030/0697 (2013.01); B29K 2009/00 (2013.01); B29L 2030/00 (2013.01)

(58) Field of Classification Search
    CPC ........ B29C 47/0805; B29C 2947/9258; B29C 2947/92695; B29C 2947/92704; B29C 2947/92857; B29D 30/0685; B29D 2030/0686; B29D 2030/0694; B29D 2030/0697; B29K 2009/00; B29L 2030/00
    USPC ........................................................ 156/115
    See application file for complete search history.

(56) References Cited

U.S. PATENT DOCUMENTS

| | | | | |
|---|---|---|---|---|
| 4,760,228 | A * | 7/1988 | Kudo | B29C 35/10 219/686 |
| 8,738,158 | B2 * | 5/2014 | Sims | H05B 37/029 700/108 |
| 2005/0020773 | A1 * | 1/2005 | Lechat | C08L 53/00 525/89 |
| 2005/0189061 | A1 * | 9/2005 | Kudo | B29D 30/3028 156/117 |
| 2009/0188607 | A1 * | 7/2009 | Tatara | B29D 30/28 156/117 |
| 2011/0272858 | A1 * | 11/2011 | Tamir | B09B 3/0025 264/319 |
| 2013/0202829 | A1 | 8/2013 | Voge et al. | |

OTHER PUBLICATIONS

Jim Frankland, Extrusion: How Much L/D Do You Really Need?, 2011. https://www.ptonline.com/columns/how-much-Id-do-you-really-need (Year: 2011).*

Jan H. Schut, High-Speed Extrusion: Are You Ready for the Fast Lane?, 2008. https://www.ptonline.com/articles/high-speed-extrusion-are-you-ready-for-the-fast-lane (Year: 2008).*

* cited by examiner

METHOD FOR PLACING A SELF-SEALING PRODUCT ON THE INNER SURFACE OF A TIRE

CROSS-REFERENCE TO RELATED APPLICATIONS

The present invention claims priority to PCT International Patent Application Serial No. PCT/EP2015/060118 filed May 7, 2015 entitled "Method For Placing A Self-Sealing Product On The Inner Surface Of A Tire," which claims the benefit of FR Patent Application Serial No. 1454248 filed May 13, 2014, the entire disclosures of the applications being considered part of the disclosure of this application and hereby incorporated by reference.

BACKGROUND OF THE INVENTION

1. Field of the Invention

The disclosure relates to the field of the manufacture of tires and more particularly to the field of tires comprising compositions with self-sealing properties used as a puncture-resistant layer, and that are intended to fill in the perforations thus making it possible to avoid the tire going flat when in use.

2. Related Art

These self-sealing compositions are defined by their physicochemical properties and are characterized in that they are capable, under the effect of the internal pressure in the tire, of flowing into the flow paths of the air towards the outside, with a view to sealing them and re-establishing airtightness. They must also be specially adapted to retain a good dimensional stability under the effect of temperature variations, gravity forces or centrifugal forces, so as not to modify the distribution of the masses in the tire.

Many compositions capable of producing these effects are described in the prior art, but have never really been able to be developed in pneumatic tires for vehicles, in particular due to lack of stability over time or of effectiveness under extreme operating temperature conditions, or else due to difficulties in the manufacture and/or use of these self-sealing compositions.

Thus, in order to help to maintain a good effectiveness at high temperature, document U.S. Pat. No. 4,113,799 (or FR-A-2 318 042) proposed, as self-sealing layer, a composition comprising a combination of partially crosslinked high and low molecular weight butyl rubbers, optionally in the presence of a small portion of styrene thermoplastic elastomer.

Document U.S. Pat. No. 4,228,839 proposed, as self-sealing layer for a tire, a rubber blend containing a first polymer material that is degraded by irradiation, such as polyisobutylene, and a second polymer material that is crosslinked by irradiation, preferentially a butyl rubber.

Document U.S. Pat. No. 4,426,468 itself also proposed a self-sealing composition for a tire based on crosslinked butyl rubber having a very high molecular weight.

Butyl rubbers have, despite everything, the drawback of exhibiting high hysteresis losses (i.e. a high tan $\delta$ level) over a broad temperature range, which drawback has an impact on the self-sealing compositions themselves with a high increase in the hysteresis, and a significant degradation of the rolling resistance of the pneumatic tires.

Therefore, alternatively, it may prove advantageous to use, for the same type of application, self-sealing compositions based on unsaturated diene elastomer (natural rubber) that are described for example in publications U.S. Pat. No. 4,913,209, U.S. Pat. No. 5,085,942 and U.S. Pat. No. 5,295,525. These compositions are characterized by the combined presence of a high content of hydrocarbon resin as tackifier, always greater than 100 parts by weight per hundred parts. In addition, a large amount of liquid elastomer gives a high fluidity to the composition which is a source of other drawbacks, in particular a risk of the self-sealing composition flowing during use at relatively high temperature (typically above 60° C.) frequently encountered during the use of the tires in certain geographical regions.

More promising, a composition free of butyl rubber and of large amounts of hydrocarbon resin and liquid elastomer is described in publication FR 2 955 587 by the applicant. This composition is based on a blend of a polybutadiene or butadiene copolymer elastomer and a natural rubber or synthetic polyisoprene elastomer (the weight ratio between the two elastomers being within a range of from 10:90 to 90:10); on a hydrocarbon resin (between 30 and 90 phr); and on a filler (0 to less than 30 phr).

These compositions simultaneously contain a network of long elastomeric chains of high molecular weight, and a network of short elastomeric chains of low molecular weight. In the crosslinked state, the long elastomeric chains form a network capable of elastically surrounding the shorter elastomeric chains that are therefore more suitable for retaining their plastic properties.

All these compositions are characterized in that, in the non-crosslinked state, and in the crosslinked state, they have a fluidity and a tack that are very high in comparison with the rubber compositions that are conventionally incorporated into the manufacture of tires. This high level of tack does not make it possible to carry out the curing of these compositions in a mould, since removal from the mould after curing is virtually impossible.

However, the pressure and containment conditions, such as are present during curing in a mould, must be respected during the curing of the elastomer-based compositions in order to obtain the expected properties of the material after crosslinking.

Therefore, the use thereof in standard extrusion and assembly processes is the origin of quite a source of problems.

In particular, during the assembly process, the creation and the application on a receiving surface of a profiled element having calibrated dimensional characteristics prove particularly tricky in that the geometry of the profiled element may be significantly deformed under the effect of the mechanical stresses linked to the handling operations and the transfer of said profiled element, such as the debonding of a support, the tensioning during the application, etc.

SUMMARY OF THE INVENTION AND ADVANTAGES

The object of the disclosure is to solve these difficulties by taking advantage of the rheological properties mentioned above, and that these materials may have under the effect of the temperature or high mechanical stresses.

Thus, against all the received ideas on the shaping of extrusion products, it has been demonstrated that the high plasticity of the self-sealing materials at high temperature allowed the shaping thereof in an extrusion die when they are already in a very advanced phase of their crosslinking.

According to the disclosure, the process for applying a rubber-based self-sealing composition on the internal surface of a casing which adopts its customary shape under the effect of an internal air pressure, comprises the steps during which:

a non-crosslinked self-sealing composition is introduced into an extrusion means, the geometric and thermodynamic characteristics of which have been specially adapted, the speed and temperature conditions of the extrusion means are adjusted so that, at an application nozzle forming the outlet die of said extrusion means, the self-sealing composition is crosslinked and, the application nozzle is brought close to the internal surface of said casing previously set in relative motion with respect to the application nozzle, and an extruded and crosslinked bead having a given width and profile is deposited directly on said internal surface of the casing The shaping and the final deposition inside the tire are carried out in a single step, which makes it possible to do away with all the intermediate handling phases of the product as is common practice in a conventional assembly process.

In order to assess the state of crosslinking of the self-sealing composition and the change thereof from the non-crosslinked state to the crosslinked state, use will preferentially be made of the value of the G"/G' (Tg δ) ratio of the self-sealing composition and it is then ensured that this ratio decreases by a value greater than 0.1 and preferentially by a value greater than 0.2, when it changes from the non-crosslinked state to the crosslinked state.

Preferentially, the value of the G"/G' (Tg δ) ratio of the non-crosslinked self-sealing composition is between 1.2 and 3 and even more preferentially between 1.25 and 2.5.

Preferentially, the value of the G"/G' (Tg δ) ratio of the crosslinked self-sealing composition is between 0.66 and 2 and even more preferentially between 0.80 and 1.4.

Advantageously, the properties of shear thinning and of reducing the viscosity as a function of the temperature of the self-sealing composition are combined with the method of supplying heat so as to control the integrity of the elastomeric matrix during crosslinking in the extruder. Thus, the self-sealing composition used for the implementation of the disclosure has shear-thinning behaviour, it is therefore understood that its viscosity decreases with the increase in the shear rate that is applied to it in the extruder. The method of applying heat is then chosen so that the composition is crosslinked at the outlet die or nozzle of the extruder.

Preferentially, the extrusion means is formed by a screw of length (L) and of diameter (D) rotated inside a barrel.

Preferentially, the ratio (L/D) between the length and the diameter of the screw is between 15 and 30. These values of the ratio L/D were chosen after tests carried out in the laboratory so that the residence time of the material under pre-established conditions in the extruder enables the crosslinking of the material at the outlet thereof for a throughput that ensures a good productivity of the application process according to the disclosure. Specifically, the application rate sets the extrusion throughput and, in connection with the volume of product contained in the extruder and its die, the residence time of the product in this assembly. Since the curing takes place entirely in the extruder and its die, the residence time in this assembly and the curing time are one and the same. The curing temperature is adjusted as a function of the residence time in order to achieve the optimum degree of curing at the nozzle outlet. The correct compromise between maximum temperature of the material and residence time is obtained by adjusting the volume of product contained and therefore the ratio L/D.

Preferentially, the temperature and speed conditions of the extrusion means are adjusted so that the composition remains inside the extrusion means at a temperature between 150° C. and 200° C. for a time of between 1 min and 20 min and preferably of between 1 min and 6 min.

Preferentially, the temperature and speed conditions of the extrusion means are adjusted so that the amount of thermal energy supplied to the self-sealing composition in the form of mechanical energy is less than 75% of the total thermal energy supplied to said self-sealing composition.

Preferentially, the output speed of the self-sealing composition from the application nozzle is between 1 ms$^{-1}$ and 4 ms$^{-1}$.

Preferentially, the self-sealing composition is deposited by coiling said bead by varying the pitch and the axial position of the application nozzle with respect to the tire casing. This makes it possible to use a single nozzle and therefore to do away with the use of tools specially designed for each tire size.

Preferentially, said bead is applied continuously by moving the application nozzle tangentially to the internal surface of the tire from the equator of the casing to a first shoulder, then by starting again in the opposite direction in the direction of a second opposite shoulder passing through the equator, and by finally coming back to the equator. Such a bead application method makes it possible to ensure a homogeneous distribution of the masses inside the tire, and therefore to minimize the impact on the initial uniformity characteristics of the same tire.

Preferentially, the tire casing is in the vulcanized state.

As has already been mentioned above, the self-sealing materials have very particular modulus characteristics that make evaluating their state of vulcanization difficult. The term "vulcanization", also and more generally the term "crosslinking" are understood here to mean the formation of bonds between the components of the elastomer matrix and the elements of the vulcanization system. The most common crosslinking systems are sulphur-based systems, for which reference will then be made to vulcanization systems, but the invention may also relate to other known crosslinking systems such as for example peroxide-based crosslinking systems.

The degree of crosslinking, δ, is calculated by measuring the amount of free sulphur, i.e. sulphur that is not bonded to an elastomer chain. When all the free sulphur of the composition has been consumed, it is considered that the crosslinking/vulcanization is achieved, and that the degree of crosslinking δ is 100%.

By comparison, it is possible to evaluate the degree of crosslinking, at a given temperature, in this case at the set point temperature of the process, by measuring the change in the stiffness of the composition with the aid of a rheometer, and by comparing this stiffness to the maximum stiffness obtained by the self-sealing composition when it is considered to be completely crosslinked, i.e. when its stiffness no longer changes.

When the stiffness measurements are carried out with an oscillating chamber rheometer according to the standard DIN 53529-part 3 (June 1983), where the measurements are processed according to the standard DIN 53529-part 2 (March 1983), it will be considered by comparison that the vulcanization is practically achieved when the torque measured at the outlet of the application nozzle is at least equal to 80% of the maximum torque.

However, considering the specificity of the self-sealing compositions that have very low stiffness levels, it proves difficult to accurately measure the degree of vulcanization using the means described above.

Therefore, within the context of the disclosure that is the subject of the present description, it is proposed to make use of substitute measurements that make it possible to assess the degree of crosslinking/vulcanization, by determining the Tg δ value which is the ratio of the viscous modulus and of the elastic modulus G"/G'.

The method of measuring G' and G" uses an oscillating disc rheology device of RPA type, such as the 2000 device supplied by the company Alpha Technologies™, equipped with the 20 in.lbs (22.6 dNm) standard viscosity sensor. The RPA machine makes it possible to stress in torsion a sample of material enclosed in a chamber having biconic walls. This method is described below with reference to the standard ISO 3417 of February 2009, which gives the preparation and test parameters for analysing a vulcanization time of a sample in the rheometer and in which certain parameters have been modified in order to take into account the very low stiffness of the compounds of self-sealing type.

In order to carry out the measurement, a sample of material of around 30 mm in diameter and having a mass of around 6 g is deposited in the chamber of the RPA (a total volume of 7 $cm^3$ is considered to be optimal; the amount is sufficient when a small amount of sample escapes from each side of the chamber and when it is visible at the end of the test).

At the end of this operation, the sample is partially moulded in the sealed chamber of the RPA.

The sample is then brought to a set point temperature directly in the chamber of the RPA.

It is then possible to begin the measurement of the value of G' and G" at a given alternating dynamic shear rate, and within predefined frequency and temperature ranges.

In the case of the self-sealing compositions that are the subject of the present application, the value of Tg δ is measured at a temperature of 130° C., at an alternating strain amplitude of 40% and for a range of frequencies between 0.033 Hz and 1 Hz. The value retained for the measurement of the Tg δ is the value observed at a frequency of 0.033 Hz.

The self-sealing compounds have the distinctive feature of seeing the value of Tg δ drop substantially when they change from the non-vulcanized state to the vulcanized state. This reduction is of at least 0.1 and as a general rule greater than 0.2.

Thus, within the context of the disclosure and of the present description, a non-crosslinked/non-vulcanized self-sealing compound is understood to mean a compound having a Tg δ value between 1.2 and 3 and preferably between 1.25 and 2.5. And a crosslinked/vulcanized self-sealing compound is understood to mean a compound having, at the outlet of the extrusion nozzle, a Tg δ value between 0.66 and 2 and preferably between 0.8 and 1.4.

The object of the following description is to illustrate, in a nonlimiting manner, an example of implementation of the disclosure and is based on FIGS. 1 to 3 in which:

DETAILED DESCRIPTION OF THE ENABLING EMBODIMENT

Figure 1:
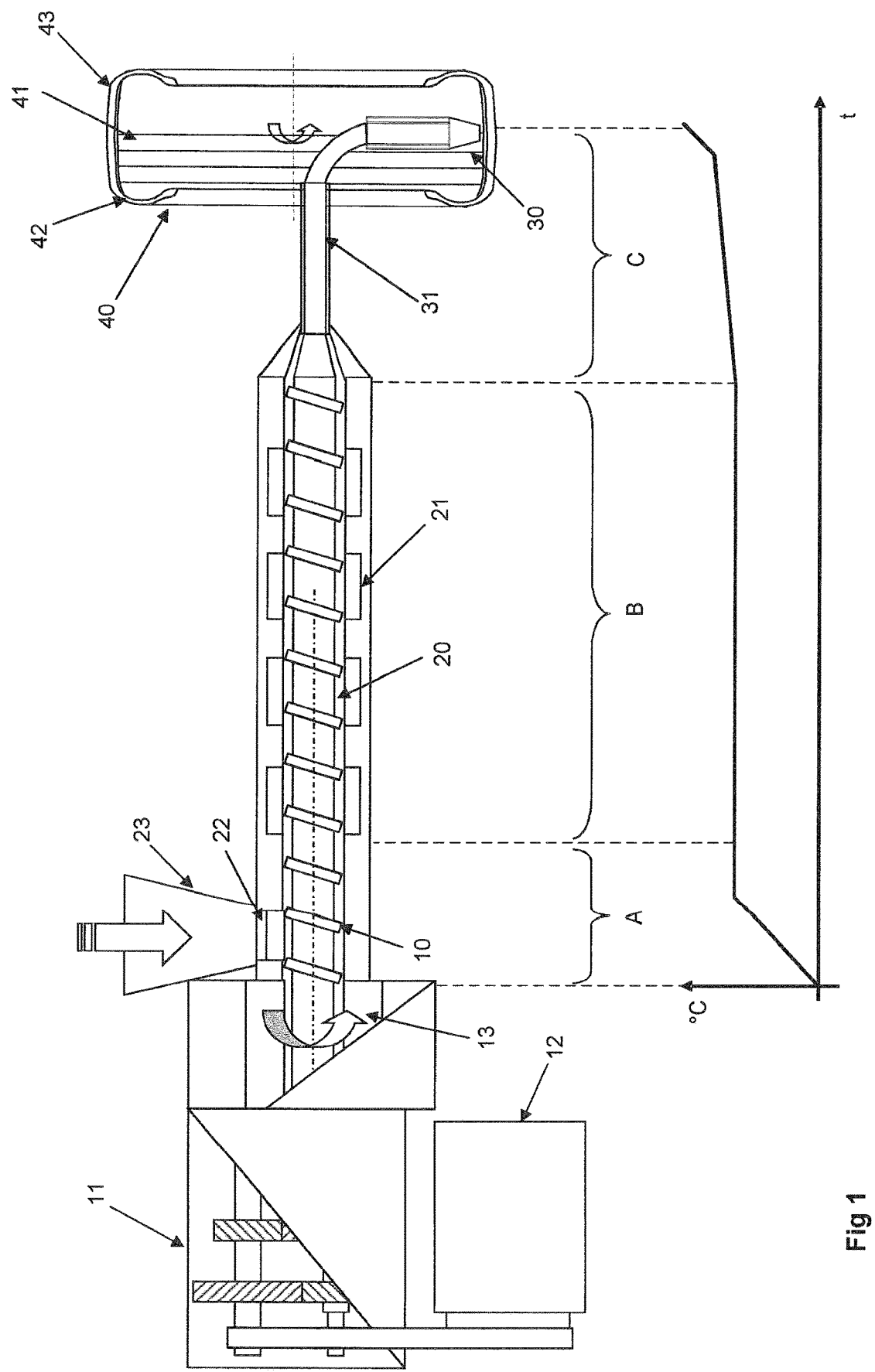
FIG. 1 represents an extrusion device capable of implementing the process according to the disclosure.

FIG. 1 represents an extrusion device capable of implementing the process according to the disclosure. This extrusion device mounted on a load-bearing frame 13 comprises a screw 20 rotated in a barrel 10 by a motor 12 and a reducer 11.

The barrel comprises, upstream, a feed zone 23 through which the non-crosslinked self-sealing composition is introduced. A feed roller 22 makes it possible to ensure a good regularity of the introduction of the compound.

Positioned downstream of the extrusion assembly is a duct 31 that opens into an application nozzle 30 of known type, and that is described by way of example in publication EP 268 544 or else in publication EP 264 600.

The application nozzle is positioned opposite the internal surface of a tire 40 rotating about its axis, so as to allow the deposition by successive coilings of a bead 41 of the self-sealing composition, of calibrated profile and thickness. A movement of axial displacement in translation is imparted to the nozzle in order to be able to continuously deposit several beads 41 by traverse winding, this nozzle being connected to the outlet of the extruder by a flexible tube.

The barrel 10 comprises heating means 21. These heating means are capable of regulating the temperature of the barrel over a range extending from 140° C. to 220° C. so as to maintain the temperature of the material between 150° C. and 200° C.

Preferentially, means will therefore be chosen such as heater bands, a heat pipe specially suitable for operating at this temperature level, or else means such as pressurized steam, for which it will be pointed out here that they are more difficult to implement in order to regulate the temperature over the range considered. It is also possible to install heating means of the same type as before in the body of the screw in order to supply extra heat to the composition.

The process for crosslinking the self-sealing composition is linked to several parameters that relate just as much to the configuration of the extrusion means as to the rheology and the composition of the self-sealing compound, the general principles of which will be recalled below.

Indeed, it is advisable to selectively adjust the processing parameters of the extrusion device so that the energy supplied to the composition over the transfer time is sufficient to obtain a crosslinked composition at the point of leaving the application nozzle 30.

The thermal change as a function of time of the composition in the course of its movement inside the barrel is represented schematically by the diagram that appears in FIG. 1.

The first zone A, close to the feed zone, has the objective of changing the temperature of the composition from the temperature of introduction, likened to the ambient temperature in the workshop, to the set point temperature between, for most of the self-sealing compositions used, 140° C. and 220° C. and preferentially between 170° C. and 200° C.

In steady state (normal operating state is understood), the heat input during the residence of the composition in the transfer zone B is relatively constant.

Finally, the passage of the composition into the duct and into the application nozzle, corresponding to extrusion zone C, in which the composition experiences greater heating during a relatively brief time (the time axis on the graph from FIG. 1 being solely illustrative and not significant when it comes to the time representation scale from one zone with respect to the other). Thus, during tests carried out in the laboratory, it was established that the residence time or duration of the material in zone C is equal to or less than 10% of the total residence time of the material between the moment when it is heated to the set point temperature in the feed zone A and the outlet at the application nozzle 30, this total residence time constituting the curing time of the material with a view to the crosslinking thereof.

The choice of the set point temperature will depend firstly on the rotational speed of the screw, which will act, on the one hand, on the residence time of the composition inside the barrel, which varies the conductive heat inputs from the walls to the compound and, on the other hand, on the mechanical energy arising from the friction and shearing of the compound between the walls of the screw and of the barrel and that is converted to thermal energy; for this purpose, it is possible to adapt the gap between the flights of the screw and the barrel which defines the shearing undergone by the self-sealing composition.

For practical reasons, and in particular for controlling the cycle times, which may comprise shutdown phases during which the screw is stopped, it may be sought to increase the portion of the mechanical energy converted to heat so as to reduce the energy inputs during the shutdown phases and so as not to impair too significantly the vulcanization reaction due to the extension of the energy input by contact with the walls, the thermal inertia of which is high.

However, it is not possible to let the portion of the mechanical energy increase beyond certain limits. Indeed, it has been demonstrated that the self-sealing compounds are capable of losing their properties when they are subjected to excessively high shear rates. Therefore, it will be ensured that the energy transmitted by the mechanical effects is less than 75% of the total of the thermal input imparted to the compound. This limit, the objective of which is to reduce the effects of conduction, makes it possible to obtain relatively stable crosslinking states, for cycle interruption times that may range up to ten or so minutes.

In order to adjust the conductive heat input, it is possible for example to modify the flight height, the value of the exchange area between the composition circulating in the body of the extrusion means and the heating parts of said extrusion means. It is also possible to act on the set point temperature of the heating means 21.

Figure 2:
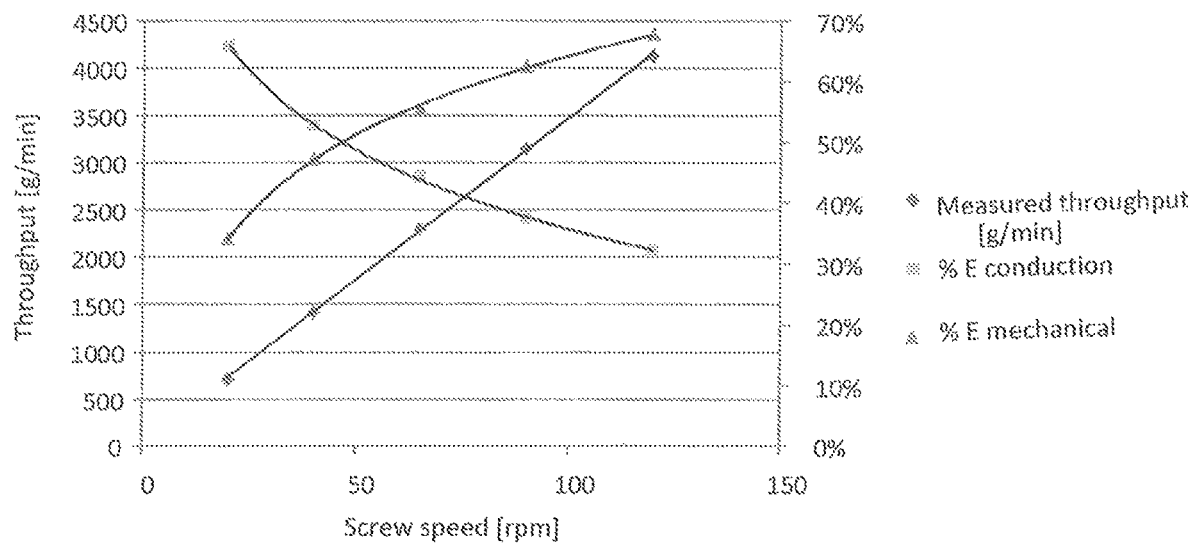
FIG. 2 represents a graph of distribution of the heat inputs imparted to the self-sealing composition as a function of the throughput and of the rotational speed of the screw.

The graph from FIG. 2, determined for obtainment conditions and for a self-sealing composition as defined below, and in which the speed is given on the x-axis and the outlet throughput on the y-axis, makes it possible to illustrate the distribution of the heat inputs originating from the mechanical energy due to shearing on the one hand and from the energy supplied by conduction by the walls on the other hand. These values were obtained with a screw speed of between 20 rpm and 120 rpm.

In view of what has just been disclosed, a person skilled in the art will observe without difficulty that the more the screw speed increases, the more the heating linked to the mechanical energy increases, and the shorter the residence time in the extrusion means. By carrying out appropriate experimental designs, it is easy to determine the operating parameters that make it possible to regulate this equilibrium.

It is also possible to adapt the length of the screw relative to its diameter, so as to increase the residence time without adversely affecting the outlet throughput. By considering a screw of diameter D and of length L, the ratio L/D may usefully be between 15 and 30.

By way of example of the implementation of the process according to the disclosure, the set point values obtained for a self-sealing composition, the composition of which is described in publication FR 2 955 587 by the applicant, will be indicated below. This composition is based on a blend of at least two solid elastomers, a polybutadiene or butadiene copolymer elastomer and a natural rubber or synthetic polyisoprene elastomer, (the weight ratio between the two elastomers being within a range of from 10:90 to 90:10); on a hydrocarbon resin (between 30 and 90 phr); and on a filler (0 to less than 30 phr).

In an example of a self-sealing composition used for the implementation of the disclosure, this composition comprises a solid unsaturated diene elastomer (blend of 50 phr of solid NR with 50 phr of solid BR; number-average molar mass Mn of the blend of elastomers equal to around 270 000 g/mol in the final composition); a hydrocarbon resin "Escorez 2101" from Exxon Mobil (Tg equal to around 44° C.; softening point equal to around 90° C.; Mn equal to around 800 g/mol; PDI equal to around 2.1) at a weight content of around 50 phr; around 15 phr of liquid polybutadiene elastomer ("Ricon 154" from Sartomer Cray Valley—Tg equal to around −20° C.; Mn equal to around 5000 g/mol and PDI equal to around 1.4); 0.5 phr of sulphur combined with 0.5 phr of DPG; it also comprises a very small amount (around 1 phr) of carbon black (N772) and around 3 phr of antioxidant.

In order to obtain a composition for which the Tg □ value of the non-crosslinked material at the start of the process is 1.52, and for which the Tg □ value of the crosslinked material at the outlet of the nozzle is 1.15, the set point values of the parameters of the process in stabilized mode were the following:

EXAMPLE 1

Temperature: 150° C. to 180° C.
Screw diameter: 120 mm
Screw length: 1800 mm
Screw/barrel gap: 0.1 mm
Duct length: 500 mm
Nozzle outlet cross section: 30 mm$^2$
Ratio of the screw-barrel exchange areas: 0.5
Throughput: 1.5 kg/min
Conduction/self-heating ratio: 1/3-2/3
Average residence time: 8 min

EXAMPLE 2

Figure 3:
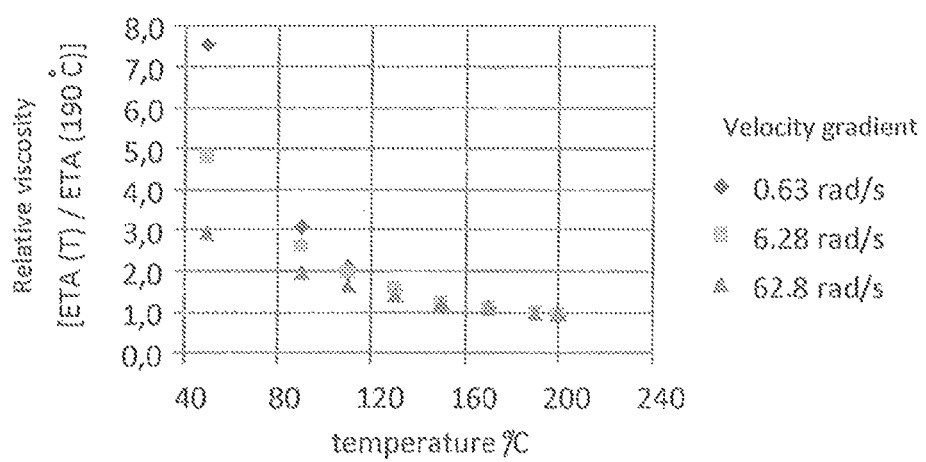
FIG. 3 represents a diagram illustrating the shear-thinning behaviour of the self-sealing composition, in particular the variation of the viscosity with the shear rate at low temperature and the change thereof with temperature.

Temperature: 150° C. to 200° C.
Screw diameter: 120 mm
Screw length: 1800 mm
Screw/barrel gap: 0.1 mm
Duct length: 2300 mm
Nozzle outlet cross section: 20 mm$^2$
Ratio of the screw-barrel exchange areas: 0.5
Throughput: 3 kg/min
Conduction/self-heating ratio: 1/3-2/3
Average residence time: 4 min The graph from FIG. 3 illustrates the shear-thinning behaviour of the self-sealing composition used for the implementation of the process of the disclosure where the variation in the viscosity with the shear rate at low temperature and the change thereof with temperature are noted. Thus, it is observed that the viscosity decreases when the velocity gradient increases, which gives an increasingly fluid material. It is understood that other vulcanizable self-sealing compositions may be used with the process of the disclosure as long as they have an equivalent shear-thinning behaviour.

Obviously, it is also possible to implement the process according to the disclosure with the aid of known extrusion devices, different from the one used as a basis for the present description.

By way of example, use may be made of an injection press, and the equilibrium will be sought between the heat supplied by a heating means positioned around the intake pot, and the mechanical energy transmitted to the composition during the transfer in the duct and in the nozzle. The adjustment of the parameters of this device may appear easier, but it nevertheless proves expensive in cycle time in so far as most of the heat input takes place by conduction from the walls of the cylinder.

The deposition of the self-sealing product on the inner surface of the tire is carried out in a known manner by traverse winding of a continuous bead by bringing the outlet of the application nozzle 30 close to said surface, after having previously set the tire rotating and, according to a defined pitch, by displacing the nozzle tangentially to the inner surface corresponding to a direction substantially parallel to the rotational axis of the tire. The bead formed at the outlet of the application nozzle is thus deposited directly on the internal surface of the tire.

The width and the thickness of the bead may be adjusted in order to reduce the application time. Good results appear to be able to be obtained by forming a bead having a width between 10 and 20 mm and a thickness between 1 and 2 mm.

So as to improve the visual perception of this coiling, it is proposed to subject the application nozzle to a continuous and alternating axial movement, starting from the equator of the casing by heading towards the shoulder zone 42, then by starting again in the opposite direction in the direction of the opposite shoulder 43 passing through the equator, and by finally coming back to the equator.

The advantage of the method according to the disclosure is also to be able to deposit a layer of self-sealing compound directly on the inner surface of the tire irrespective of the step of production of the latter, and in particular when the tire is completely vulcanized, as is the case for example in the warehouses intended for the delivery of the tires. This way of proceeding makes it possible to differentiate tires at the last moment, on the basis of the usage options specified by a given client. In which case, the extrusion means are positioned in the delivery store and are placed for the use of the operators responsible for organizing the orders.

The invention claimed is:

1. A method of applying a rubber-based self-sealing composition on an inner surface of a tire casing, comprising the steps of:
   introducing a non-crosslinked self-sealing composition into an extrusion device
   adjusting speed and temperature conditions of the extrusion device so that, at an application nozzle forming an outlet die of said extrusion device, the self-sealing composition is crosslinked, and
   bringing the application nozzle close to the inner surface of said casing previously set in relative motion with respect to the application nozzle, and depositing an extruded and crosslinked bead having a given width and profile directly on said internal surface of the casing.

2. The method according to claim 1, in which the value of the G"/G' (Tg δ) ratio of the self-sealing composition decreases by a value greater than 0.1 when it changes from the non-crosslinked state to the crosslinked state.

3. The method according to claim 2, in which the value of the G"/G' (Tg δ) ratio of the non-crosslinked self-sealing composition is between 1.2 and 3.

4. The method according to claim 2, in which the value of the G"/G' (Tg δ) ratio of the crosslinked self-sealing composition is between 0.66 and 2.

5. The method according to claim 1, in which the properties of shear thinning and of reducing the viscosity as a function of the temperature of the self-sealing composition are combined with the method of supplying heat so as to control the integrity of the elastomeric matrix during crosslinking in the extruder.

6. The method according to claim 1, in which the extrusion device is formed by a screw of length (L) and of diameter (D) rotated inside a barrel.

7. The method according to claim 6, in which the ratio (L/D) between the length and the diameter of the screw is between 15 and 30.

8. The method according to claim 1, in which the temperature and speed conditions of the extrusion means are adjusted so that the composition remains inside the extrusion device at a temperature between 150° C. and 200° C. for a time of between 1 min and 20 min.

9. The method according to claim 1, in which the temperature and speed conditions of the extrusion device are adjusted so that the amount of thermal energy supplied to the self-sealing composition in the form of mechanical energy is less than 75% of the total thermal energy supplied to said self-sealing composition.

10. The method according to claim 1, in which the output speed of the self-sealing composition from the application nozzle is between 1 ms$^{-1}$ and 4 ms$^{-1}$.

11. The method according to claim 1, in which the self-sealing composition is deposited by coiling said bead by varying the pitch and the axial position of the application nozzle with respect to the tire casing.

12. The method according to claim 11, in which said bead is applied continuously by moving the application nozzle tangentially to the internal surface of the tire from the equator of the casing to a first shoulder, then by starting again in the opposite direction in the direction of a second opposite shoulder passing through the equator, and by finally coming back to the equator.

13. The method according to claim 1, in which the tire casing is in the vulcanized state.

14. A method of applying a rubber-based self-sealing composition on an inner surface of a tire casing, comprising the steps of:
   introducing a non-crosslinked self-sealing composition into an inlet of an extrusion device;
   adjusting speed and temperature conditions of the extrusion device so that, at an application nozzle forming an outlet die of said extrusion device, the self-sealing composition is crosslinked, and
   bringing the application nozzle close to the inner surface of said casing previously set in relative motion with respect to the application nozzle, and depositing an extruded and crosslinked bead having a given width and profile directly on said internal surface of the casing;
   wherein the extrusion device includes an assembly comprising a screw rotated in a barrel, the extrusion device further including a duct positioning downstream of the assembly that opens into the application nozzle;

wherein the extrusion device includes a plurality of zones, and the method further includes increasing the temperature of the composition in a first zone to a set point temperature between 140 degrees C. and 220 degrees C. during a first period of time, maintaining the temperature at the set point temperature in a second zone for a second period of time, and increasing the temperature in a third zone for a third period of time, wherein the third period of time is shorter relative to the second period of time;

wherein the third zone includes the duct and the application nozzle.

15. The method of claim 14, wherein the application nozzle is axially moveable, and the bead is deposited in a coiled manner relative to the tire casing.

16. The method of claim 14, wherein the self-sealing composition is pre-mixed at a ratio of material and the ratio of material is maintained from the inlet to the outlet die.

* * * * *